DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED AUGUST 3, 1976

949 O.G. 8

T949,001

PROCESS FOR IMPROVING THE DURABILITY OF WATER-DISPERSIBLE TEXTILE FINISHES

James G. Pacifici, Rte. 16, Heatherwood, Kingsport, Tenn. 37663

Filed Feb. 11, 1975, Ser. No. 549,106

**Int. Cl.[2] B05D *3/10***

U.S. Cl. 427—341

No Drawing. 10 Pages Specification

This invention relates to a process for treating fabrics which contain textile finishes prepared from water dispersible polyester and polyesteramide compositions containing a monovalent metal cation to increase the durability of the finish. In particular, fabrics which have been coated with these finishes, coated and thermally crosslinked, or coated and radiation crosslinked are treated with an aqueous solution of a polyvalent metal cation such as $Mn^{+2}$, $Zn^{+2}$, $Ba^{+2}$, $Al^{+3}$ and $Ca^{+2}$. This process increases the durability of the finish by making the finish less soluble in water.